US008308177B2

(12) United States Patent
Fravel et al.

(10) Patent No.: US 8,308,177 B2
(45) Date of Patent: Nov. 13, 2012

(54) VEHICLE ACCESS SYSTEM WITH POWERED LIFT (76) Inventors: Gary L. Fravel, Decatur, IN (US); William C. Hamrick, Willshire, OH (US)

(*) Notice: Subject to any disclaimer, the term of this patent is extended or adjusted under 35 U.S.C. 154(b) by 340 days.

(21) Appl. No.: 12/661,651

(22) Filed: Mar. 22, 2010

(65) Prior Publication Data

US 2011/0226558 A1 Sep. 22, 2011

(51) Int. Cl.
*B60R 3/00* (2006.01)

(52) U.S. Cl. ........ 280/166; 187/270; 187/216; 187/222; 414/545

(58) Field of Classification Search .................. 414/545, 414/921, 539–540, 544, 546; 280/166; 187/270, 187/203–238
See application file for complete search history.

(56) References Cited

U.S. PATENT DOCUMENTS

| | | | | |
|---|---|---|---|---|
| 2,122,992 A * | 7/1938 | Pride | 414/608 |
| 2,579,688 A * | 12/1951 | McCormick | 187/212 |
| 2,683,540 A * | 7/1954 | Wood | 414/557 |
| 2,706,565 A * | 4/1955 | Krasno | 414/545 |
| 3,016,989 A * | 1/1962 | Lindmark | 187/270 |
| 3,024,926 A * | 3/1962 | Nolden | 414/545 |
| 3,174,634 A * | 3/1965 | Peck | 414/541 |
| 3,282,449 A * | 11/1966 | Buford | 414/540 |
| 3,488,066 A * | 1/1970 | Hansen | 280/163 |
| 3,498,414 A * | 3/1970 | White | 187/413 |
| 3,519,101 A * | 7/1970 | Sieffert | 187/256 |
| 3,520,426 A * | 7/1970 | Hostetler | 414/545 |
| 3,716,158 A * | 2/1973 | Hansen | 414/666 |
| 3,887,092 A * | 6/1975 | Leet | 414/545 |
| 3,918,596 A * | 11/1975 | Ward | 414/545 |
| 3,957,284 A * | 5/1976 | Wright | 280/166 |
| 3,986,724 A * | 10/1976 | Rivinius | 280/166 |
| 4,018,306 A * | 4/1977 | Lyons | 182/148 |
| 4,071,260 A * | 1/1978 | Marshall, Sr. | 280/166 |
| 4,110,673 A * | 8/1978 | Magy et al. | 318/466 |
| 4,116,457 A * | 9/1978 | Nerem et al. | 280/166 |
| 4,133,437 A * | 1/1979 | Gates | 414/541 |
| 4,217,971 A | 8/1980 | Rivinius | |
| 4,252,492 A * | 2/1981 | Scothern | 414/541 |
| 4,324,317 A * | 4/1982 | Winkelblech | 187/267 |
| 4,353,436 A * | 10/1982 | Rice et al. | 414/540 |
| 4,356,894 A | 11/1982 | Everett | |
| 4,738,581 A * | 4/1988 | Kuhlman | 414/462 |
| 4,813,842 A * | 3/1989 | Morton | 414/557 |
| 4,915,573 A * | 4/1990 | Wapner et al. | 414/540 |
| 4,982,974 A | 1/1991 | Guidry | |
| 5,028,063 A * | 7/1991 | Andrews | 280/166 |

(Continued)

*Primary Examiner* — Jeffrey J Restifo
*Assistant Examiner* — Erez Gurari
(74) *Attorney, Agent, or Firm* — Bose McKinney & Evans LLP (57) ABSTRACT A lift assembly installable on a vehicle. The lift assembly includes a support structure securable to the vehicle, a pair of parallel vertically extending geared tracks and a vertically moveable drive assembly. The drive assembly includes (a) a mounting structure; (b) a selectively reversible motor; (c) a pair of gears; and (d) a moveable first tread. The gears are engaged with the tracks and rotatably supported on the mounting structure. The gears are also drivingly coupled with the motor wherein operation of the motor selectively raises and lowers the mounting structure relative to the support structure. The moveable first tread is secured to the mounting structure and is adapted to support an operator whereby raising and lowering the mounting structure raises and lowers an operator positioned on the first tread. In some embodiments, the lift assembly includes water-resistant foot-operable switches to control the raising and lowering of the mounting structure.

19 Claims, 5 Drawing Sheets

U.S. PATENT DOCUMENTS

| | | | |
|---|---|---|---|
| 5,092,617 A | 3/1992 | Jones, Jr. | |
| 5,145,031 A | 9/1992 | Sprunger | |
| 5,176,486 A * | 1/1993 | Park | 414/472 |
| 5,234,311 A * | 8/1993 | Loduha et al. | 414/546 |
| 5,273,132 A * | 12/1993 | Sasaki et al. | 182/148 |
| 5,382,130 A * | 1/1995 | Kempf | 414/540 |
| 5,513,943 A * | 5/1996 | Lugash et al. | 414/545 |
| 5,538,265 A | 7/1996 | Chen et al. | |
| 5,674,043 A * | 10/1997 | Dorn | 414/541 |
| 5,755,309 A * | 5/1998 | Harman et al. | 187/200 |
| 5,944,332 A * | 8/1999 | Lee et al. | 280/163 |
| 6,027,131 A | 2/2000 | Wijlhuizen | |
| 6,135,472 A | 10/2000 | Wilson et al. | |
| 6,325,397 B1 | 12/2001 | Pascoe et al. | |
| 6,926,295 B2 * | 8/2005 | Berkebile et al. | 280/166 |
| 7,025,365 B2 * | 4/2006 | Bang et al. | 280/166 |
| 7,287,771 B2 * | 10/2007 | Lee et al. | 280/166 |
| 7,370,725 B1 | 5/2008 | Dornfeld | |
| 7,546,902 B2 * | 6/2009 | Schwertner | 187/241 |
| 7,621,546 B2 * | 11/2009 | Ross et al. | 280/166 |
| 8,043,040 B2 * | 10/2011 | Nespor | 414/545 |
| 2004/0154870 A1 * | 8/2004 | Bass et al. | 187/270 |
| 2005/0238471 A1 * | 10/2005 | Ablabutyan et al. | 414/546 |
| 2006/0181049 A1 * | 8/2006 | Kobayashi et al. | 280/166 |
| 2007/0267842 A1 * | 11/2007 | Seibert et al. | 280/166 |
| 2009/0285661 A1 * | 11/2009 | Nespor | 414/545 |
| 2010/0054900 A1 * | 3/2010 | Houtveen et al. | 414/541 |
| 2010/0264618 A1 * | 10/2010 | Agoncillo et al. | 280/166 |
| 2011/0233889 A1 * | 9/2011 | Watson | 280/166 |

* cited by examiner

VEHICLE ACCESS SYSTEM WITH POWERED LIFT

BACKGROUND OF THE INVENTION

1. Field of the Invention

The present invention relates to devices used in the entry and exit of motorized vehicles and, more particularly, to a powered device that can be used to raise and lower the operator of a vehicle during the entry and exiting of the vehicle.

2. Description of the Related Art

Semi-trailer tractors, large trucks and other vehicles which have operator compartments that are positioned at a relatively high position above the ground surface typically require steps located on the exterior of the vehicle to allow the operator of the vehicle to enter and exit the operator compartment. Many vehicle operators find it difficult to climb into and down from the operator compartments of such vehicles. Moreover, there are several common health problems that can compound the difficulty of using fixed stationary steps to climb into and out of such large vehicles. For example, operators with arthritis or who have undergone joint replacement surgery may find it extremely difficult to climb into and out of such vehicles. Contemporary society is also experiencing a large increase in obesity and obese individuals often find it difficult to climb into and out of such large vehicles.

While various devices have been developed to address this difficulty such devices often have features, such as a relatively high cost, that inhibit the widespread adoption of such devices. An improved device that can be manufactured and installed in a cost-efficient manner and which provides assistance to operators entering and exiting from elevated vehicle compartments remains desirable.

SUMMARY OF THE INVENTION

The present invention provides a robust and cost-efficient lift assembly that can be installed on a vehicle to assist the operator of the vehicle when entering or exiting the vehicle.

The invention comprises, in one form thereof, a lift assembly adapted for installation on a vehicle having an electrical system. The lift assembly includes a support structure securable to the vehicle, a pair of parallel vertically extending geared tracks disposed on said support structure and a vertically moveable drive assembly. The vertically moveable drive assembly includes (a) a mounting structure; (b) a selectively reversible motor secured to the mounting structure and adapted to receive an electrical current from the electrical system of the vehicle whereby the motor can be powered; (c) a pair of gears; and (d) a moveable first tread. The pair of gears are respectively engaged with the tracks and rotatably supported on the mounting structure. The gears are also drivingly coupled with the motor wherein selective reversible operation of the motor selectively reversibly rotates the pair of gears and thereby selectively raises and lowers the mounting structure relative to the support structure. The moveable first tread is secured to the mounting structure and is adapted to support an operator whereby raising and lowering the mounting structure raises and lowers an operator positioned on the first tread.

In some embodiments, the lift assembly may include first and second water-resistant foot-operable switches that are disposed on the first tread wherein activation of the first switch raises the mounting structure and activation of the second switch lowers the mounting structure.

The invention comprises, in another form thereof, a kit adapted for installation on a vehicle wherein the vehicle includes an electrical system and has a first removeable tread adapted for supporting an operator entering or exiting the vehicle. The kit includes a support structure securable to the vehicle, a pair of parallel vertically extending geared tracks disposed on the support structure and a vertically moveable drive assembly. The vertically moveable drive assembly includes (a) a mounting structure; (b) a selectively reversible motor secured to the mounting structure and adapted to receive an electrical current from the electrical system of the vehicle whereby the motor can be powered; (c) a pair of gears; and (d) at least one tread support bracket. The pair of gears are respectively engaged with the tracks and rotatably supported on the mounting structure. The gears are also drivingly coupled with the motor wherein selective reversible operation of the motor selectively reversibly rotates the pair of gears and thereby selectively raises and lowers the mounting structure relative to the support structure. The at least one tread support bracket is disposed on the mounting structure and is adapted to support the first tread whereby raising and lowering the mounting structure raises and lowers the at least one tread support bracket and the first tread.

Such a kit can be relatively easily installed on an existing vehicle. When such vehicles have existing treads already installed on the vehicle, the treads can be used with the kit to reduce the cost of installation.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 1:
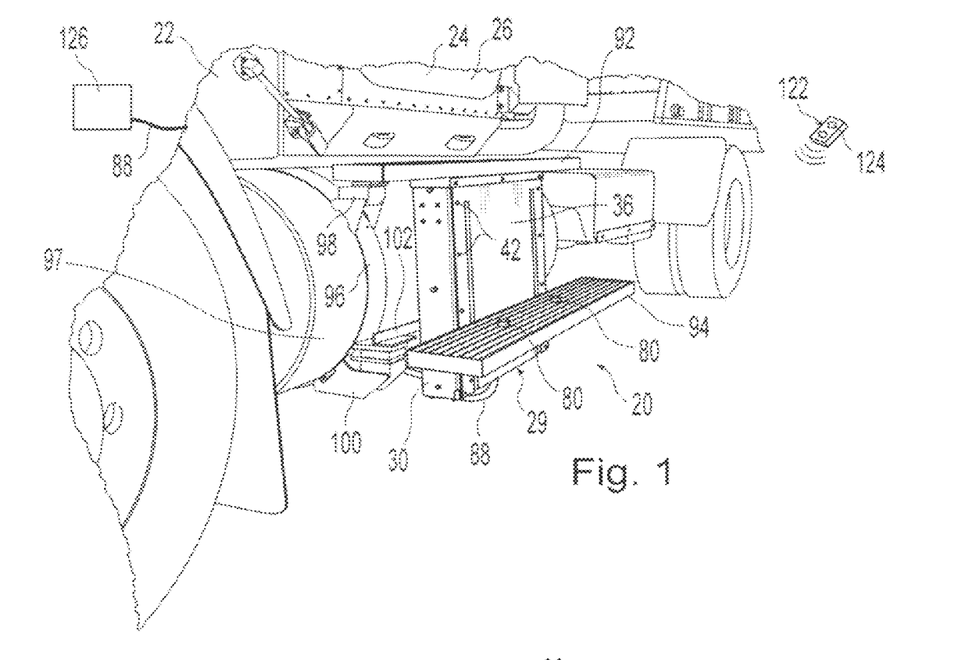
FIG. 1 is a perspective view of a lift assembly installed on a vehicle.
Figure 2:
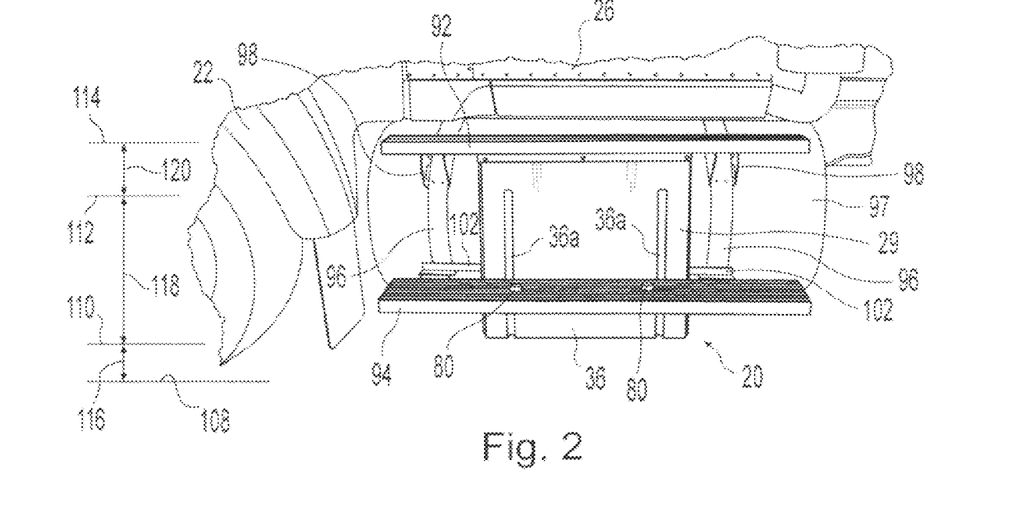
FIG. 2 is a side view of the lift assembly and vehicle shown in FIG. 1.

A powered lift assembly 20 mounted on a vehicle 22 in accordance with the present invention is shown in FIGS. 1 and 2. As will be discussed in greater detail below, assembly 20 provides a means for an operator of vehicle 22 to easily enter and exit the operator compartment 24 of vehicle 22 through access door 26. Although the illustrated vehicle 18 is a conventional semi-trailer tractor, assembly 20 can be mounted on other styles of semi-trailer tractors and various other vehicles where it is desirable to provide a powered vertical lift for the operator of the vehicle.

Assembly 20 includes a support structure 28 that is secured to vehicle 22. Support structure 28 includes two side framing members 30, a top framing member 32 and a bottom framing member 34. In the illustrated embodiment, each of the support members 30, 32, 34 are formed by cutting and bending a sheet of 7 gauge ASTM A569 CQ ("commercial quality) HRPO (hot rolled, pickled and oiled) steel plate to form an elongate member having a generally C-shaped cross-section. Framing members 30, 32, 34 are secured together to form a strong and rigid rectilinear structure.

Figure 7:
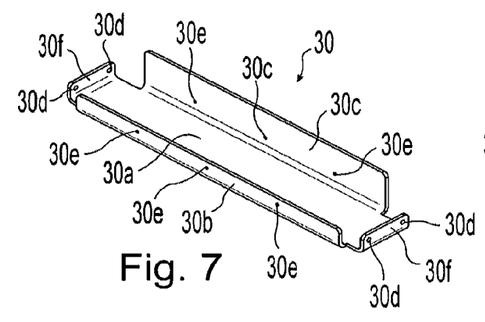
FIG. 7 is a perspective view of a side framing member.

One of the side members 30 is shown in FIG. 7. The second side member 30 has a similar configuration. In the illustrated embodiment, each of the side members 30 have a central web 30a with a width of 4 inches (10.16 cm), a front lip 30b with a width of 1.25 inches (3.18 cm) and rear lip 30c with a width of 2.5 inches (6.35 cm). Small flanges 30f projecting approximately 2.25 inches (5.72 cm) outwardly from web 30a are located at the opposite ends of central web 30a and extend in the same general direction as front and rear lips 30b, 30c. In the illustrated embodiment, openings 30d are provided in flanges 30f for securing side members 30 to top and bottom members 32, 34 using fasteners, e.g., threaded nuts and bolts. Alternative securing means, such as welding can also be used to secure support members 30, 32 and 34 together. Similarly, smaller openings 30e located in lips 30b, 30c are provided for securing front cover 36 and rear cover 38 using threaded fasteners or other suitable attachment methods.

Figure 8:
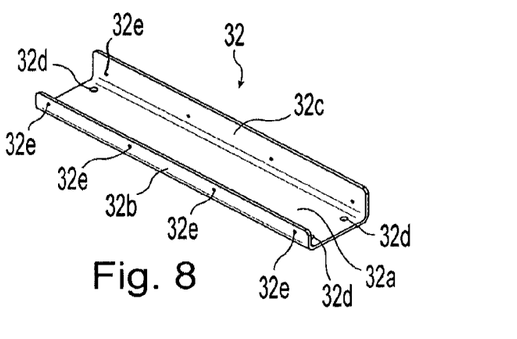
FIG. 8 is a perspective view of the top framing member.

Top member 32 is depicted in FIG. 8 and has a central web 32a with a width of 4 inches (10.16 cm), a front lip 32b with a width of 1.25 inches (3.18 cm) and rear lip 32c with a width of 2 inches (5.08 cm). In the illustrated embodiment, openings 32d are provided in web 32a for securing top member 32 to respective flanges 30f of the two side members 30. Smaller openings 30e located in lips 30b, 30c are used to secure front cover 36 and rear cover 38.

Figure 9:
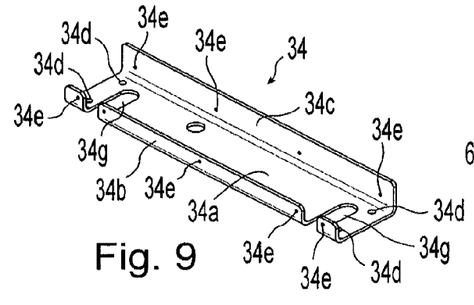
FIG. 9 is a perspective view of the bottom framing member.

Bottom member 34 is depicted in FIG. 9 and has a configuration generally similar to top member 32 having a central web 34a with a width of 4 inches (10.16 cm), a front lip 34b with a width of 1.25 inches (3.18 cm) and a rear lip 34c with a width of 2 inches (5.08 cm). Bottom member 34 also includes large openings 32d for securing bottom member 34 to flanges 30f of the two side members 30 and smaller openings 30e for securing front cover 36 and rear cover 38. Unlike top member 32, bottom member 34 also includes an electrical conduit opening 34f and bracket slots 34g. As further discussed below, electrical wiring 88 enters the closed housing 29 formed by support structure 28 through conduit opening 34f while vertically moveable tread support brackets 62 extend through slots 34g.

Figure 3:
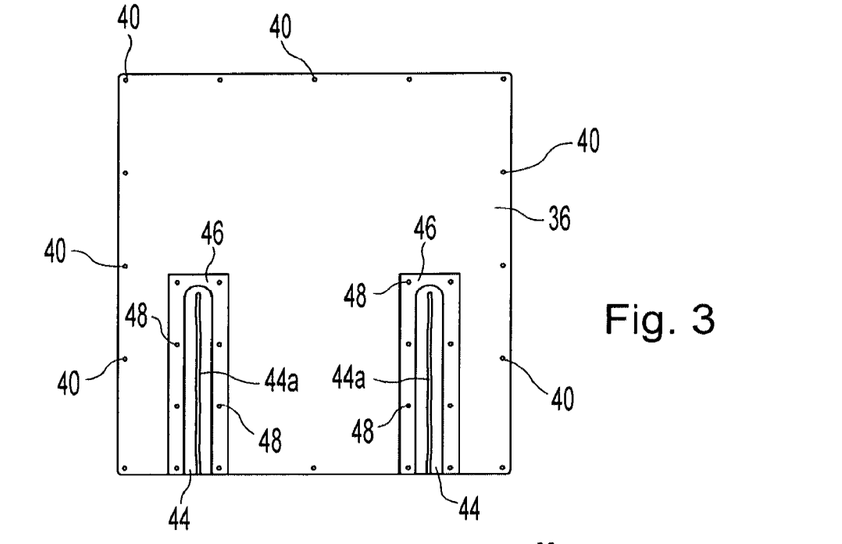
FIG. 3 is a view of the rear surface of the front cover.
Figure 6:
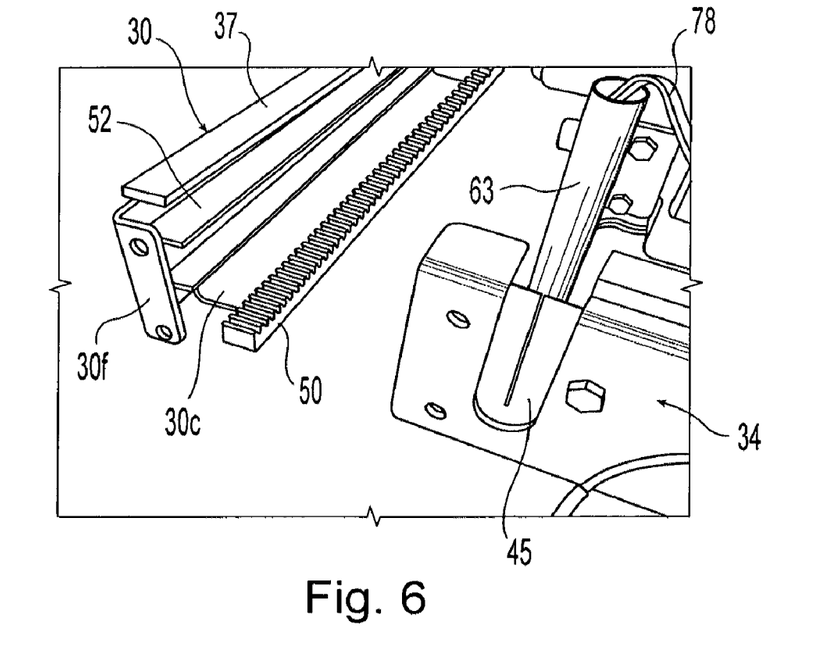
FIG. 6 is another partial perspective view of the lift assembly.

In the illustrated embodiment, front cover 36 is a sheet of 0.100 inch (0.25 cm) thick 3003 aluminum diamond plate and rear cover 38 is a 12 gauge ASTM A569 CQ HRPO steel plate. Front cover 36 and rear cover 38 are both provided with a plurality of openings 40 along their edges. Threaded fasteners 42 are inserted through openings 40 to removeably secure front and rear covers 36, 38 to support members 30, 32, 34. Front cover 36 also includes elongate vertically extending slots 36a. Vertically moveable tread support brackets 62 extend through slots 36a. Flexible membranes 44 formed out of rubber or other suitable material are secured to the rear surface of front cover 36 over slots 36a to inhibit water and debris from entering the enclosed housing 29. Membranes 44 each include a slit 44a which allows for the vertical movement of brackets 62. As can be seen in FIG. 3, sheet metal backing members 46 having elongate slots overlay membranes 44. Fasteners 48 secure backing members 47 to front cover 36 and thereby secure membranes 44 between backing members 47 and front cover 36. Smaller slotted flexible membranes 45 are secured over slots 34g in bottom support member 34 to inhibit ingress of water and debris through slots 34g. As can be seen in FIG. 6, a strip of foam weather stripping 37 or other suitable material can be secured on framing members 30, 32, 34 to inhibit the entry of water and debris through the joint between front and rear covers 36, 38 and frame members 30, 32, 34.

Figure 4:
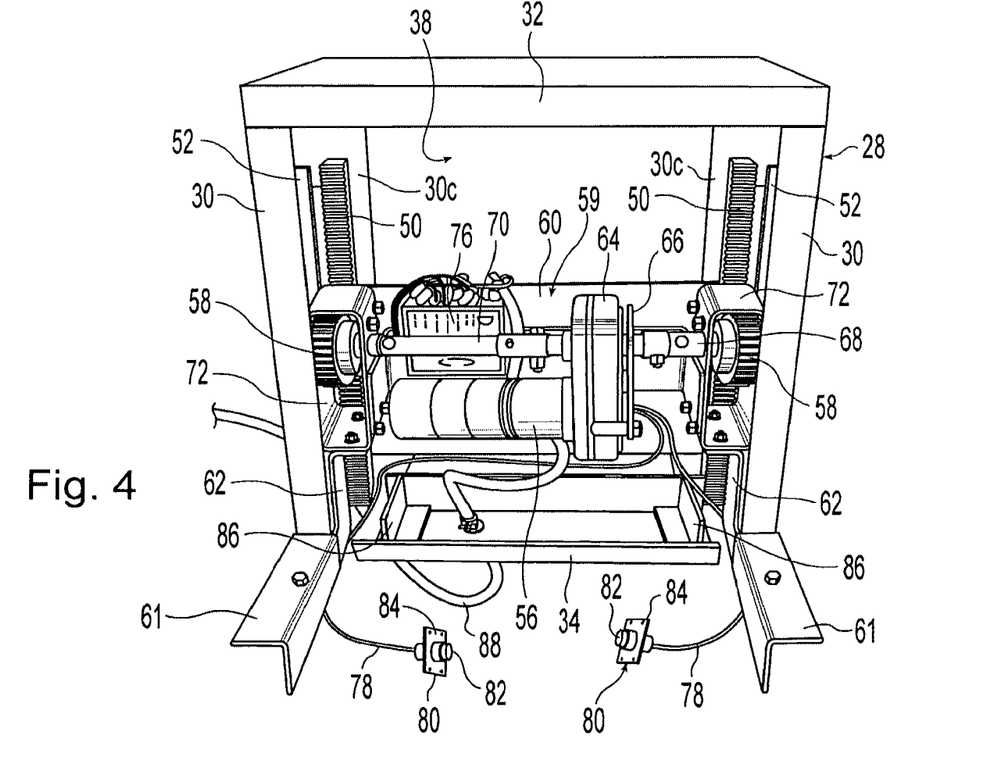
FIG. 4 is a view of the lift assembly with the front cover and treads removed.
Figure 14:
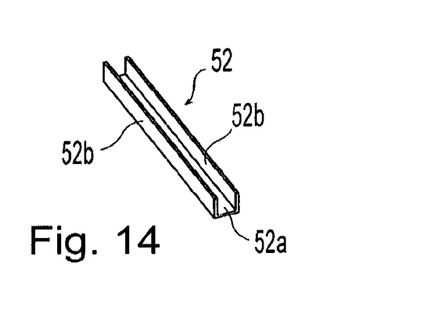
FIG. 14 is a perspective view of the guide channel.

A pair of elongate vertically extending geared tracks or racks 50 are secured to the support structure. As can be seen in FIGS. 4 and 6, racks 50 are welded to rear lips 30c of side frame members 30 in the illustrated embodiment. Extending parallel with racks 50 and positioned proximate racks 50 on central webs 30a are a pair of vertically extending elongate guide channels 52. As best seen in FIG. 14, guide channels 52 have a C-shaped cross section with a central web 52a and a pair of projecting flanges 52b. In the illustrated embodiment, guide channels 52 are formed with 12 gauge ASTM A569 CQ HRPO steel plate and are welded to central web 30a of side frame members 30. Guide channels 52 are positioned proximate and extend parallel to racks 50 which are welded to rear lips 30c of side frame members 30.

Support structure 28 also includes four stops 86 secured near the four corners of support structure 28. Stops 86 are formed out of short lengths of L-shaped steel channels. Two of the stops 86 are secured to top framing member 32 and limit the upward travel of bearing mount brackets 72. The other two stops 86 are secured to bottom framing member 34 and limit the downward travel of bearing mount brackets 72.

Disposed within housing 29 and engaged with racks 50 is a vertically moveable drive assembly 54. Drive assembly 54 includes a selectively operable reversible electric motor 56 and a pair of rotatable gears 58. A gear box 64 and drive shafts 68, 70 operably couple motor 56 with gears 58. The motor and gear assembly are supported on a mounting structure 59. Primary bracket 60 forms a significant portion of mounting structure 59 which also includes several subsidiary brackets. Two of the subsidiary brackets secured to mounting structure 59 and forming a part thereof are tread support brackets 62.

Figure 10:
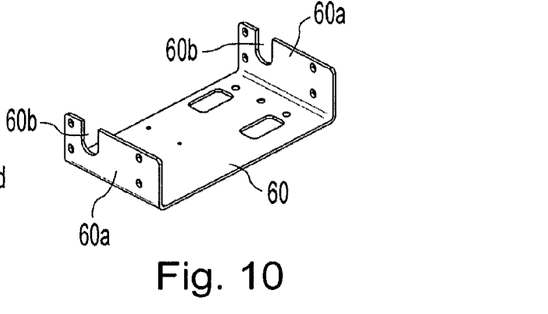
FIG. 10 is a perspective view of the motor mounting structure.
Figure 13:
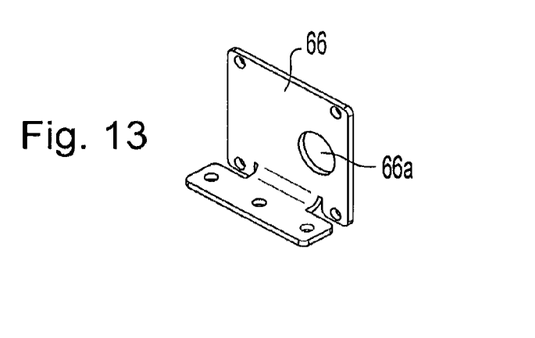
FIG. 13 is a perspective view of the motor mounting bracket.

Gear box 64 is attached to motor 56 and both motor 56 and gear box 64 are attached to primary bracket 60 with a motor mount bracket 66. Primary bracket 60 and motor mount bracket 66 are best seen in FIGS. 10 and 13 respectively and are formed out of 7 gauge ASTM A569 CQ HRPO steel plate. Drive shafts 68, 70 are linearly arranged and extend between gear box 64 and gears 58. Large opening 66a in bracket 66 permits passage of drive shaft 68 therethrough.

The combined assembly of motor 56 and gear box 64 in the illustrated embodiment is a medium duty combination worm drive and spur gear driven gearbox with an electric motor brake. Such combined units are commercially available, e.g., the 9800 series unit, from Venture Manufacturing having a place of business in Dayton, Ohio. The electric motor brake ensures that if motor 56 loses electrical power, gears 58 will remain locked in a stationary position. Thus, if a person is standing on moveable tread 94 and motor 56 loses electrical power, tread 94 will remain in a stationary position instead of falling to its lowest position.

Bearing mount brackets 72 are secured to end flanges 60a on primary bracket 60. Slots 60b in flanges 60a allow drive shafts 68, 70 to extend therethrough. Bearing mount brackets 72 each include a pair of aligned openings 72a. Bearings are mounted within openings 72a and rotatably support gears 58 within bearing mount brackets 72. Suitable rotatable gears 58 and corresponding racks 50 can be obtained from McMaster-Carr having a place of business in Robbinsville, N.J.

Tread support brackets 62 are secured to the bottom of bearing mount brackets 72 using threaded fasteners, welding or other suitable means. In the illustrated embodiment, bearing mount brackets 72 are formed out of a 6 inch by 2 inch by 3/16 inch ASTM A500 Grade B structural steel tube.

Figure 11:
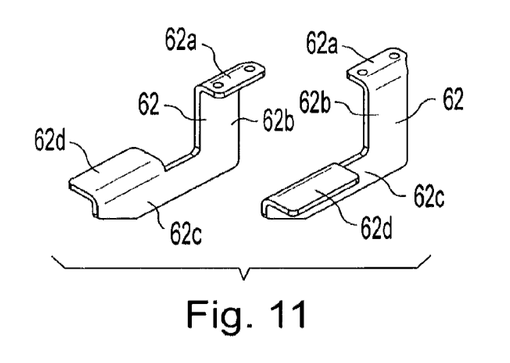
FIG. 11 is a perspective view of the tread mounting brackets.
Figure 12:
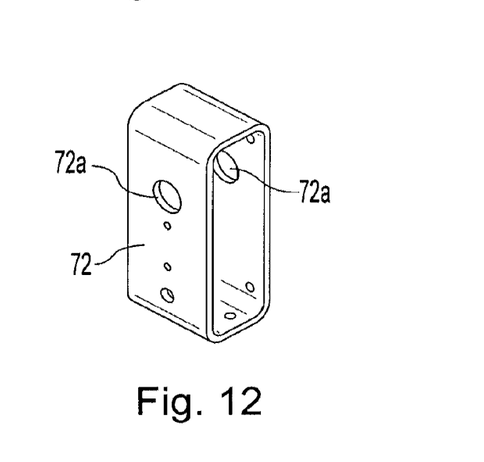
FIG. 12 is a perspective view of a bearing mount.

A pair of tread support brackets is illustrated in FIG. 11. Each of the tread support brackets 62 includes a flange 62a that is used to attach the brackets 62 to a bearing mount 72. A vertical section 62b extends downwardly from flange 62a. A projecting portion 62c extends outwardly of housing 29 and has a mounting flange 62d. Tread 94 can be attached directly to mounting flange 62d using suitable means such as threaded fasteners or welding. Alternatively, an intermediate bracket 61 (FIGS. 4 and 5) can be used to secure tread 94 to support bracket 62. A short length of steel tubing 63 (FIGS. 5, 6 and 17) is welded to projecting portion 62c and is used to route wiring 78 extending between switches 80 and controller 78. In the illustrated embodiment, brackets 62 are formed out of 0.25 inch (0.64 cm) thick 1008/1010 (CQ) HRPO steel plate.

Figure 5:
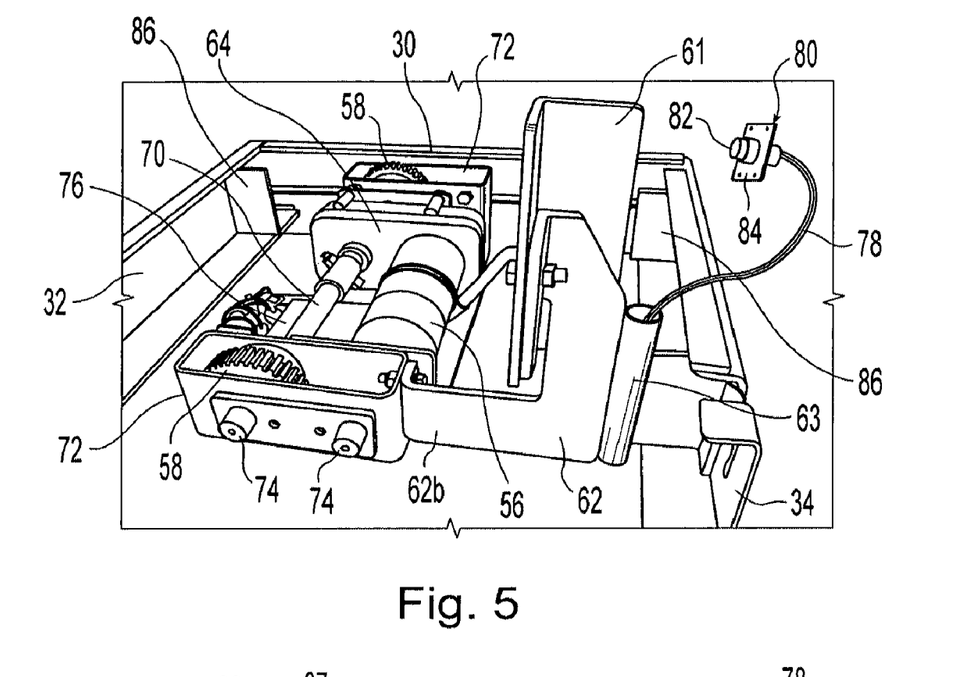
FIG. 5 is a partial perspective view of the lift assembly.

As best seen in FIG. 5, two spaced apart guide members 74 are secured to the laterally outer surfaces of bearing mount brackets 72. Guide members 74 project into guide channels 52 and are engageable with flanges 52b to thereby limit movement of mounting structure 59 relative to support structure 28. Guide members 74 facilitate the proper alignment of structure 59 with structure 28 and keep gears 58 engaged with racks 50. Guide members 74 can take various forms, for example, guide members 74 can be roller guides with an outer rotatable ring mounted on ball bearings. Instead of two spaced apart roller guides, guide members 74 can also take the form of UHMW ("ultra high molecular weight") polyethylene blocks which slide within guide channels 52. Although it will generally be desirable to use two spaced apart guide members 74 with each guide channel 52, if the sliding block is sufficiently long to inhibit rotation of mounting structure 59 relative to support structure 28, a single guide member 74 could be used with each guide channel 52. Various other suitable guide members which are capable of traveling within guide channels 52 with minimal resistance while maintaining the proper alignment of mounting structure 59 can also be employed.

Figure 18:
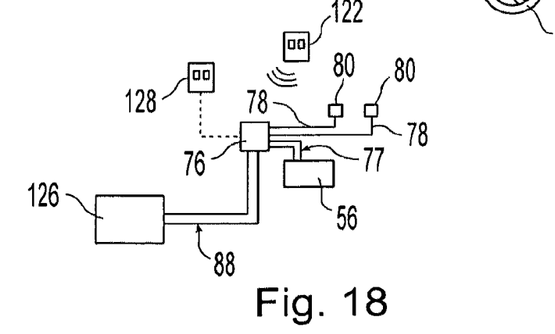
FIG. 18 is a schematic diagram of the lift assembly.

A controller 76 is also secured to mounting structure 59. The schematic diagram of FIG. 18 illustrates how wiring 88 communicates 12 volt direct current from the existing electrical system 126 of vehicle 22 to controller 76. Wiring 88 is advantageously connected with electrical system 126 such that lift assembly 20 receives electrical current from the vehicle battery regardless of whether or not the engine of vehicle 22 is running. Wiring 77, in turn, controllably communicates electrical current to motor 56 for operating motor 56. Switches 80 are in communication with controller 76 via wiring 78. Activation of one of the switches 80 operates motor 56 in a first direction to raise drive assembly 54 along with any person standing on tread 94 while activation of the other switch 80 operates motor 56 in the opposite direction lowering drive assembly 54 and any person standing on tread 94.

In the illustrated embodiment, controller 76 is a commercially available RV motor controller that is commonly used to control and protect a motor for extending and retracting the slide-out room of a recreational vehicle. For example, the KCCA0005 RV motor controller from Kinetek Controls having an office in Perry, Ohio can be used with the present invention. Such controllers are designed to be integrated into a conventional 12 volt electrical system of a recreational vehicle and can be easily adapted for use with the present invention. Controller 76 both controls the operation of reversible motor 56 and protects motor 56 against extended overcurrent conditions with an automatic resetting breaker.

Figure 17:
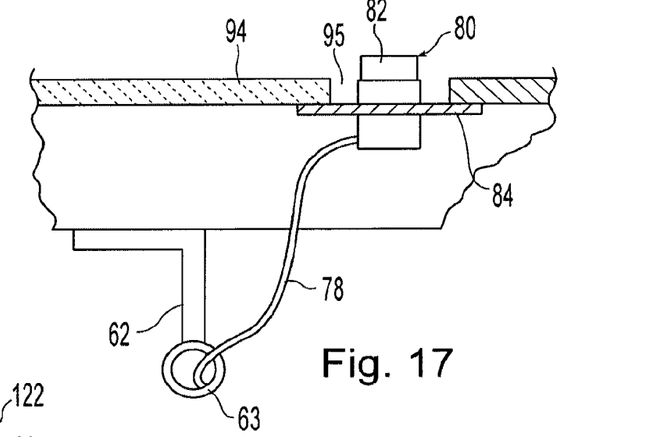
FIG. 17 is a cross sectional view showing a switch mounted in the lower tread.

The mounting of switches 80 on tread 94 is schematically depicted in FIG. 17. In the illustrated embodiment, openings 95 are formed in tread 94 and switches 80 are secured therein. The activator 82 of switches 80 project upwardly through openings 95 so that a person standing on tread 94 can activate the desired switch 80 with a foot by stepping on the switch. A mounting flange 84 is used to secure switches 80 to tread 94.

By positioning both of the foot-operable switches 80 between the tread support brackets 62 and also between racks 50, the operator will be encouraged to stand in the central portion of tread 94 located between the support brackets 62 which is also located between racks 50. By having the operator stand in this central portion of tread 94, the possibility of binding gears 58 and racks 50 during operation of motor 56 will be reduced relative to having the operator stand at one of the opposite ends of tread 94.

It is also noted that switches 80 are mounted outside of housing 29 and will be exposed to the weather. Particularly, in those regions where road salt is applied to the roadways, switches 80 can be exposed to relatively harsh environmental conditions. To facilitate the long-life of switches 80, it is advantageous to use marine grade switches. Marine grade switches are water resistant switches that are designed for use in boating and marine applications which experience relatively harsh environmental conditions. In this regard, it is noted that it is only a portion of tread support brackets 62, tread 94 and switches 80 that are positioned outside of housing 29. Motor 56, gears 58 and a substantial majority of the mounting structure 59 remain within the enclosed housing 29 throughout the vertical travel limits of mounting structure 59 and thereby receive some protection from the exterior environment.

It is further noted that lift assembly 20 may optionally utilize other devices to control the operation of lift assembly 20 in addition to foot-operable switches 80. As schematically depicted in FIG. 18, it is also possible to utilize a wireless transmitter 122 having user operable controls 124 to control the operation of lift assembly 20 and thereby raise and lower tread 94. For example, a suitable reverse polarity DC motor control with remote control transmitter is commercially available as part no. RFRI2VPRWP from GAMA Electronics, Inc. having a place of business in Crystal Lake, Ill.

FIG. 18 also depicts an optional user interface unit 128 for controlling the operation of lift assembly 20 that utilizes wiring to communicate with controller 76. Interface unit 128 can be mounted within the operator compartment 24 of vehicle 22. Advantageously, unit 128 is positioned where it can be accessed both by a person standing on the ground surface after opening door 26 and by a person located within operator compartment 24.

Prior to installation of lift assembly 20 on vehicle 22, upper and lower treads 92, 94 were fixedly secured below door 26 in a conventional manner. More specifically, a pair metal straps 96 are wrapped about tank 97. A pair of upper brackets 98 are attached to straps 96 and upper tread 92 is secured to brackets 98. A pair of lower brackets 100 are also secured to straps 96 and lower tread 94 was originally fixedly secured to brackets 100. When installing lift assembly 20, the attachment between upper tread 92 and brackets 98 was left undisturbed. Lower tread 94, however, was removed from lower bracket assemblies 100.

Figure 15:
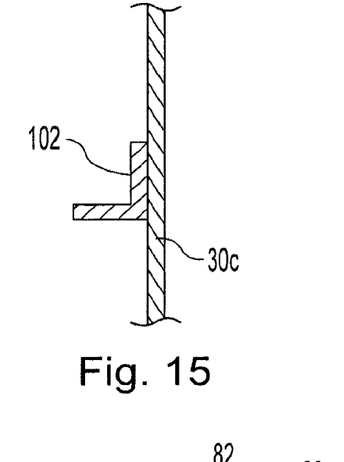
FIG. 15 is a cross sectional view of the exterior support bracket.

To install lift assembly 20 on vehicle 22, an elongate L-shaped channel member 102 was secured to bracket assemblies 100 and extends therebetween. As schematically depicted in FIG. 15, channel member 102 is also secured to the rear lips 30c of both side frame members 30. In the illustrated embodiment, channel member 102 is shown welded to both bracket assemblies 100 and rear lips 30c, however, other suitable means of attachment, such as the use of the threaded fasteners could alternatively be employed.

Figure 16:
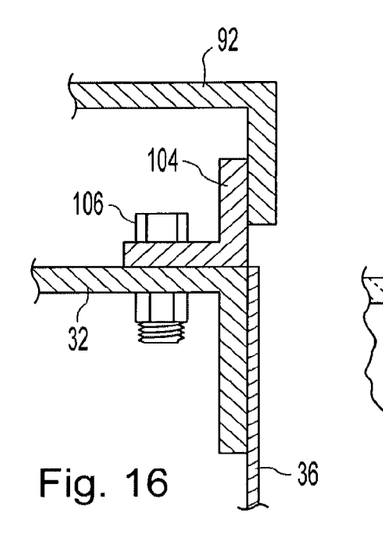
FIG. 16 is a cross sectional view showing the attachment of the upper tread.

FIG. 16 schematically depicts the fixed attachment of upper tread member 92 to lift assembly 20. In FIG. 16, an L-shaped bracket member 104 is welded to tread 92 and attached to upper frame member 32 using a threaded fastener assembly 106. As will be recognized by those having ordinary skill in the art, various other bracketry and attachment methods can be used to secure lift assembly 20 to vehicle 22 and to other vehicles having configurations that differ from vehicle 22.

Although lift assembly 20 can be installed as original equipment on vehicles, it is well adapted for installation on vehicles originally provided with stationary, fixed treads for providing access to the operator compartment of the vehicle. Lift assembly 20 can be manufactured and installed in a cost-efficient manner on such vehicles by providing lift assembly 20 in a kit form. Quite often, the owners of large vehicles possess the equipment and skills necessary to form and install the bracketry necessary to attach lift assembly 20 to a large vehicle. Thus, the initial cost of lift assembly 20 can be minimized by providing lift assembly 20 without such attachment bracketry. Moreover, because the vehicles on which lift assembly 20 will be installed generally include pre-existing treads, the cost of lift assembly 20 can be further minimized by providing lift assembly 20 as a kit without a tread. The purchaser of lift assembly 20 will generally be able to remove a tread from their vehicle and properly attach it to lift assembly 20 and install switches 80 on the tread. Thus, by providing lift assembly 20 without attachment bracketry and without a tread, the cost of lift assembly 20 can be minimized without significantly impairing the ease of installation. Lift assembly 20 can, of course, also be provided with various attachment bracketry and with a pre-installed tread having switches 80 already mounted therein.

Lift assembly 20 can be beneficial for a wide variety of different large vehicles. These vehicles do not all have the same exterior configuration. Thus, when manufacturing lift assemblies 20, it may be necessary to adjust the dimensions of the lift assembly to account for the available space in which lift assembly 20 can be mounted and the necessary vertical range through which the mounting structure must travel. It is thought that lift assemblies having support structures with the following three different sizes will fit a large percentage of all such vehicles: (i) 18 inches (45.72 cm) wide by 20 inches (50.8 cm) tall; (ii) 24 inches (60.96 cm) wide by 20 inches (50.8 cm) tall; and (iii) 24 inches (60.96 cm) wide by 24 inches (60.96 cm) tall. Of course, lift assemblies 20 having alternative dimensions can also be provided.

The use of lift assembly 20 will now be addressed. Prior to installation of assembly 20, both upper tread 92 and lower tread 94 were secured to vehicle 22 in fixed positions. The operator entered vehicle 22 by first stepping onto lower tread 94 and then upper tread 92 before entering the operator compartment 24 through door 26. This process was reversed when the operator exited the vehicle. When secured in a fixed position, lower tread 94 must be at a height that provides sufficient road clearance. This positioning of lower tread 94, however, makes it difficult for many operators to enter vehicle 22.

The height at which tread 94 is depicted in FIGS. 1 and 2 is the approximate height at which tread 94 was originally secured to vehicle 22 prior to installation of lift assembly 20. As discussed above, after installation of lift assembly 20, the selective operation of motor 56 raises and lowers mounting structure 59 and lower tread 94 secured thereto. With reference to FIG. 2, the ground or road surface is indicated by line 108. The lower limit of travel for tread 94 is indicated by line 110 and the upper limit of travel for tread 94 is indicated by line 112. Line 114 indicates the height of upper tread 94. In the illustrated embodiment, the length of vertical travel 118 for vertically moveable tread 92 is approximately 14 inches. Length 116 represents the vertical distance between ground surface 108 and the lowest position of tread 94 while length 120 represents the distance between fixed position upper tread 92 and moveable lower tread 92 when tread 92 is at its uppermost position.

As can be readily appreciated, when using lift assembly 20, an operator will lower tread 94 to its lowest position (if it is not already at its lowest position) before stepping onto tread 94. The operator will then step on the switch 80 which raises tread 94, and the operator standing thereon, until tread 94 has reached its upper travel limit. The operator will then step onto upper tread 92 and then enter vehicle 22. When exiting the vehicle, the operator will raise tread 94 (if it is not already at its uppermost position). The operator will then exit the operator compartment 24 by stepping onto fixed upper tread 92. Next, the operator will step onto the raised tread 94 and step on the appropriate switch 80 for lowering tread 94. After tread 94, and the operator standing thereon, have been lowered to the lowest position of tread 94, the operator will step off tread 94 onto the ground surface 108.

As the above description illustrates, tread 94 will generally be in the appropriate location, i.e., its uppermost or lowermost position, when an operator desires to either enter or exit the vehicle. Deviations from this typical use pattern or other special circumstances, however, could result in the tread 94 being at an intermediate or uppermost location when the operator desires to enter the vehicle or at an intermediate or lowermost location when the operator desires to exit the vehicle. In such circumstances, a wireless control unit 122 and/or hard wired control unit 128 mounted within the operator compartment provide for the convenient repositioning of tread 94.

For lift assemblies 20 having a vertical travel range 118 of approximately 14 inches, the vertical distance 116 between ground surface 108 and tread 94 and the vertical distance 120 between tread 94 and tread 92 can both reduced by approximately 7 inches in comparison to the original fixed location of the lower tread. This reduction in step height, which can differ for alternative embodiments of the present invention, can be of significant benefit to a person having difficulty climbing into and out of vehicle 22.

While this invention has been described as having an exemplary design and many aspects of the illustrated embodiment have been discussed with great specificity, these details may vary for different embodiments of the invention and the present invention may be further modified within the spirit and scope of this disclosure. This application is therefore intended to cover any variations, uses, or adaptations of the invention using its general principles.

What is claimed is:

1. A lift assembly adapted for installation on a vehicle having an electrical system, said lift assembly comprising:
   a support structure securable to the vehicle;
   a pair of parallel vertically extending geared tracks disposed on said support structure;
   a vertically moveable drive assembly, said drive assembly including:
   (a) a mounting structure;
   (b) a selectively reversible motor secured to said mounting structure and adapted to receive an electrical current from the electrical system of the vehicle whereby said motor can be powered;
   (c) a pair of gears respectively engaged with said tracks and rotatably supported on said mounting structure, said pair of gears being drivingly coupled with said motor wherein selective reversible operation of said motor selectively reversibly rotates said pair of gears and thereby selectively raises and lowers said mounting structure relative to said support structure; and
   (d) a moveable first tread secured to said mounting structure and adapted to support an operator whereby raising and lowering said mounting structure raises and lowers an operator positioned on said first tread.

2. The lift assembly of claim 1 further comprising:
   a pair of support brackets extending from said mounting structure, said first tread being secured to said tread support brackets; and
   first and second foot-operable switches disposed on said first tread between both said pair of tread support brackets and said pair of geared tracks, activation of said first switch raising said mounting structure and activation of said second switch lowering said mounting structure.

3. The lift assembly of claim 2 wherein each of said first and second switches is a water-resistant switch.

4. The lift assembly of claim 1 further comprising a wireless control unit communicable with said motor wherein said wireless control unit selectively operates said motor.

5. The lift assembly of claim 1 further comprising
   a pair of vertically extending guide channels, each of said guide channels being disposed on said support structure proximate a respective one of said pair of geared tracks; and
   a pair of guide members disposed on said mounting structure, said guide members being positioned wherein each of said guide members is engageably disposed within a respective one of said guide channels wherein engagement of said guide members with said guide channels limits movement of said mounting structure relative to said support structure.

6. The lift assembly of claim 5 wherein each of said guide channels defines a substantially C-shaped cross section having a central web and a pair of projecting flanges, said guide members being disposable between a respective one of said pair of flanges whereby said pairs of flanges limit movement of said guide members, said guide channels being positioned to maintain said pair of gears in contact with said geared tracks.

7. The lift assembly of claim 1 wherein said support structure includes an upper frame member, a pair of side frame members and a lower frame member secured together in a substantially rectilinear configuration, said pair of geared track members being respectively disposed on said pair of side frame members.

8. The lift assembly of claim 7 wherein each of said side frame members has a substantially C-shaped cross section defining a center web and first and second projecting flanges, each of said pair of geared tracks being disposed on a respective one of said first flanges and wherein said lift assembly further comprises
   a pair of vertically extending guide channels, each of said guide channels defining a substantially C-shaped cross section having a central web and a pair of projecting flanges, each of said guide channels being disposed on a respective one of said center webs proximate a respective one of said pair of geared tracks; and
   a pair of guide members disposed on said mounting structure, said guide members being positioned wherein each of said guide members is engageably disposed within a respective one of said guide channels and engagement of said guide members with said guide channels limits movement of said mounting structure relative to said support structure and maintains said pair of gears in contact with said geared tracks.

9. The lift assembly of claim 8 further comprising a front cover panel and a rear cover panel securable to said support structure wherein said top frame member, said pair of side frame members, said bottom frame member and said front and rear cover panels define a substantially enclosed housing wherein said motor and said pair of gears are disposed within said enclosed housing and a substantial majority of said mounting structure is disposed within said enclosed housing.

10. The lift assembly of claim 9 wherein said front cover includes at least one vertically extending bracket slot and said mounting structure includes at least one tread support bracket extending outwardly through said bracket slot, said first tread being secured on said at least one tread support bracket.

11. The lift assembly of claim 10 further comprising first and second water-resistant foot operable switches disposed on said first tread, activation of said first switch raising said mounting structure and activation of said second switch lowering said mounting structure and a second tread, said second tread being fixedly secured to said support structure above said first tread and adapted to support an operator entering and exiting the vehicle.

12. A kit adapted for installation on vehicle wherein the vehicle includes an electrical system and has a first removeable tread adapted for supporting an operator entering or exiting the vehicle, said kit comprising:
   a support structure securable to the vehicle;
   a pair of parallel vertically extending geared tracks disposed on said support structure;
   a vertically moveable drive assembly, said drive assembly including:
   (a) a mounting structure;
   (b) a selectively reversible motor secured to said mounting structure and adapted to receive an electrical current from the electrical system of the vehicle whereby said motor can be powered;
   (c) a pair of gears respectively engaged with said tracks and rotatably supported on said mounting structure, said pair of gears being drivingly coupled with said motor wherein selective reversible operation of said motor selectively reversibly rotates said pair of gears and thereby selectively raises and lowers said mounting structure relative to said support structure;
   (d) at least one tread support bracket disposed on said mounting structure and adapted to support the first tread whereby raising and lowering said mounting structure raises and lowers said at least one tread support bracket and the first tread; and wherein said at least one tread support bracket comprises a pair of tread support brackets, said kit further comprising first and second water-resistant foot operable switches mountable on the first tread between both said pair of tread support brackets and said pair of geared tracks, activation of said first switch raising said mounting structure and activation of said second switch lowering said mounting structure.

13. The kit of claim 12 further comprising a wireless control unit communicable with said motor wherein said wireless control unit selectively operates said motor.

14. The kit of claim 12 further comprising
a pair of vertically extending guide channels, each of said guide channels being disposed on said support structure proximate a respective one of said pair of geared tracks; and
a pair of guide members disposed on said mounting structure, said guide members being positioned wherein each of said guide members is engageably disposed within a respective one of said guide channels wherein engagement of said guide members with said guide channels limits movement of said mounting structure relative to said support structure.

15. The kit of claim 14 wherein each of said guide channels defines a substantially C-shaped cross section having a central web and a pair of projecting flanges, said guide members being disposable between a respective one of said pair of flanges whereby said pairs of flanges limit movement of said guide members, said guide channels being positioned to maintain said pair of gears in contact with said geared tracks.

16. The kit of claim 12 wherein said support structure includes an upper frame member, a pair of side frame members and a lower frame member secured together in a substantially rectilinear configuration, said pair of geared track members being respectively disposed on said pair of side frame members.

17. The kit of claim 16 wherein each of said side frame members has a substantially C-shaped cross section defining a center web and first and second projecting flanges, each of said pair of geared tracks being disposed on a respective one of said first flanges and wherein said lift assembly further comprises:
a pair of vertically extending guide channels, each of said guide channels defining a substantially C-shaped cross section having a central web and a pair of projecting flanges, each of said guide channels being disposed on a respective one of said center webs proximate a respective one of said pair of geared tracks; and
a pair of guide members disposed on said mounting structure, said guide members being positioned wherein each of said guide members is engageably disposed within a respective one of said guide channels and engagement of said guide members with said guide channels limits movement of said mounting structure relative to said support structure and maintains said pair of gears in contact with said geared tracks.

18. A kit adapted for installation on vehicle wherein the vehicle includes an electrical system and has a first removeable tread adapted for supporting an operator entering or exiting the vehicle, said kit comprising:
a support structure securable to the vehicle;
a pair of parallel vertically extending geared tracks disposed on said support structure;
a vertically moveable drive assembly, said drive assembly including:

(a) a mounting structure;
(b) a selectively reversible motor secured to said mounting structure and adapted to receive an electrical current from the electrical system of the vehicle whereby said motor can be powered;
(c) a pair of gears respectively engaged with said tracks and rotatably supported on said mounting structure, said pair of gears being drivingly coupled with said motor wherein selective reversible operation of said motor selectively reversibly rotates said pair of gears and thereby selectively raises and lowers said mounting structure relative to said support structure;
(d) at least one tread support bracket disposed on said mounting structure and adapted to support the first tread whereby raising and lowering said mounting structure raises and lowers said at least one tread support bracket and the first tread;
wherein said support structure includes an upper frame member, a pair of side frame members and a lower frame member secured together in a substantially rectilinear configuration, said pair of geared track members being respectively disposed on said pair of side frame members;
wherein each of said side frame members has a substantially C-shaped cross section defining a center web and first and second projecting flanges, each of said pair of geared tracks being disposed on a respective one of said first flanges and wherein said lift assembly further comprises:
a pair of vertically extending guide channels, each of said guide channels defining a substantially C-shaped cross section having a central web and a pair of projecting flanges, each of said guide channels being disposed on a respective one of said center webs proximate a respective one of said pair of geared tracks;
a pair of guide members disposed on said mounting structure, said guide members being positioned wherein each of said guide members is engageably disposed within a respective one of said guide channels and engagement of said guide members with said guide channels limits movement of said mounting structure relative to said support structure and maintains said pair of gears in contact with said geared tracks; and
a front cover panel and a rear cover panel securable to said support structure wherein said top frame member, said pair of side frame members, said bottom frame member and said front and rear cover panels define a substantially enclosed housing wherein said motor and said pair of gears are disposed within said enclosed housing and a substantial majority of said mounting structure is disposed within said enclosed housing.

19. The kit of claim 18 wherein said front cover includes at least one vertically extending bracket slot and said at least one tread support bracket extends outwardly through said bracket slot and wherein said kit further comprises first and second water-resistant foot operable switches mountable on the first tread, activation of said first switch raising said mounting structure and activation of said second switch lowering said mounting structure and wherein a second tread adapted to support an operator entering and exiting the vehicle is fixedly secured to said support structure above the first tread.

* * * * *